United States Patent
Bank et al.

(10) Patent No.: US 10,097,617 B2
(45) Date of Patent: Oct. 9, 2018

(54) CONFORMING DISTRIBUTED POSTS TO REFLECT SOCIAL NETWORKING WEB SITE ENVIRONMENTS AND AUDIENCES

(71) Applicant: INTERNATIONAL BUSINESS MACHINES CORPORATION, Armonk, NY (US)

(72) Inventors: Judith H. Bank, Cary, NC (US); Lisa M. W. Bradley, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 14/575,483

(22) Filed: Dec. 18, 2014

(65) Prior Publication Data

US 2016/0182612 A1 Jun. 23, 2016
US 2018/0020044 A9 Jan. 18, 2018

(51) Int. Cl.
*H04L 29/08* (2006.01)
*G06F 17/27* (2006.01)

(52) U.S. Cl.
CPC .......... *H04L 67/10* (2013.01); *G06F 17/2785* (2013.01)

(58) Field of Classification Search
CPC ......... H04L 67/10; H04L 67/02; H04L 51/32; G06F 17/2785
See application file for complete search history.

(56) References Cited

U.S. PATENT DOCUMENTS

| | | | |
|---|---|---|---|
| 2002/0137507 A1* | 9/2002 | Winkler | H04L 51/063 455/412.1 |
| 2008/0114846 A1* | 5/2008 | Sang | G06Q 10/107 709/206 |
| 2011/0135071 A1 | 6/2011 | Milstein | |
| 2011/0196927 A1 | 8/2011 | Vance | |
| 2012/0005224 A1* | 1/2012 | Ahrens | G06Q 10/10 707/769 |
| 2012/0136866 A1* | 5/2012 | Carter | G06Q 50/01 707/740 |
| 2013/0006602 A1* | 1/2013 | Zhu | G06F 17/289 704/2 |
| 2013/0080553 A1 | 3/2013 | Rosen | |
| 2013/0132589 A1 | 5/2013 | Erb et al. | |
| 2016/0070762 A1* | 3/2016 | Nicholls | G06F 17/30864 707/722 |

* cited by examiner

*Primary Examiner* — Chris Parry
*Assistant Examiner* — Soe M Hlaing
(74) *Attorney, Agent, or Firm* — Charles L. Moore; Moore & Van Allen PLLC (57) ABSTRACT

A method, system, and computer program product for conforming text posted on a social networking Web site for posting on another social networking Web site. The method includes receiving text input by a user for posting on a first social networking Web site. The text is analyzed to identify topical and semantic attributes of the text that are extracted with natural language processing and semantic analysis, and then compared to a historical semantic communication style between the user and the intended recipients on one or more other target social networking Web sites. The text is then converted to have topical and semantic attributes for posting on the target social networking Web sites as appropriate for the user, recipient users and user groups, and the target Web sites.

15 Claims, 6 Drawing Sheets

CONFORMING DISTRIBUTED POSTS TO REFLECT SOCIAL NETWORKING WEB SITE ENVIRONMENTS AND AUDIENCES

BACKGROUND

Aspects of the present invention relate to social networks, message boards, online mail clients and the like, and more particularly to a method, system, and computer program product for managing posts in social media and networks.

Online social networks are a universal mechanism to connect people and information in logical and organized ways which enable sharing and processing of information between the members of the social network. Common mechanisms for sharing and processing information on online social networks may include, but are not necessarily limited to, a wall or virtual wall or message board where a user or member of the social network can post messages for other users or members, an activity stream which may be a list of messages or posts received by a user or member and may also include a list of messages or posts sent by the user or member, a timeline that may chronologically list a series of events, and profiles of users or members that can be accessed for information about a particular user or member. These mechanisms enable users or members to rapidly share information with others and gather information from others in the network.

Social networking posts and message boards may be influenced by the environment, the style of language of the person making the post, and the intended reader of the post. Some social networking sites have applications that allow a user to post on one social site and automatically take that post and post it on another social networking site. However, the tone, style, idioms, topics and language of a post in one social site might not match what is desirable or appropriate to post on another site, which may require a user to post to each social networking site separately.

BRIEF SUMMARY

According to one aspect of the present invention, as method is provided for conforming text posted on a social networking Web site for posting on another social networking Web site. The method includes receiving, by a processing device, text input by a user for posting on as first social networking Web site. The text is analyzed, by a processing device, to identify topical and semantic attributes of the text. The text is then converted, by a processing device, to have topical and semantic attributes appropriate for post in a second social networking Web site.

According to another aspect of the present invention, system for conforming text posted a social networking Web site for posting on another social networking Web site is provided. The system includes a processor and as module, operating on processor, for conforming text posted on a social networking Web site for posting on another social networking Web site. This module includes a module for receiving text input by a user for posting on a first social networking Web site, a module for analyzing the text to identify topical and semantic attributes of the text, and a module for converting the text to have topical and semantic attributes appropriate for posting on as second social networking Web site.

According to a further aspect of the present invention, a computer program product for conforming text posted on a social networking Web site for posting on another social networking Web site is provided. The computer program product includes computer readable storage medium having computer readable program code boded therewith, which includes computer readable program code configured to receive text input by a user for posting on a first social networking Web site, computer readable program code configured to analyze the text to identify topical and semantic attributes of the text, and computer readable program code configured to convert the text to have topical and semantic attributes appropriate for posting for predetermined recipients on a second social networking Web site.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The present invention may be a system, a method, and/or as computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the follow following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded, to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective comps a device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block, or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments disclosed herein use analysis to determine whether the tone, style, content, subject matter, idioms, and language of a post are appropriate for a social site. If not text will be converted and customized to match the communication history of the user and/or the social network when posting. This allows the user to have his or her social network accounts federated so that they can create one post that will be appropriately applied.

A system is disclosed herein that may be an intelligent system for analyzing messages, posts, and additions to social networking Web sites to insure that they are appropriate in style, content, subject matter, and tone to the plurality of documents and posts already found on the social Web sites. The system may create and utilize a database of communication profiles and the frequency of messages adhering to these profiles to compare a message or communication with other documents (communications, messages, posts, etc.) found on this social Web site. Accordingly, the profiles may each include data that reflects characteristics including but not limited to style, content, subject matter, and tone of messages of a user, a recipient user group, and/or plurality of recipient social Web sites. The database may be located on a user's computer or a shared server and may be of any of a variety of file types.

Figure 1:
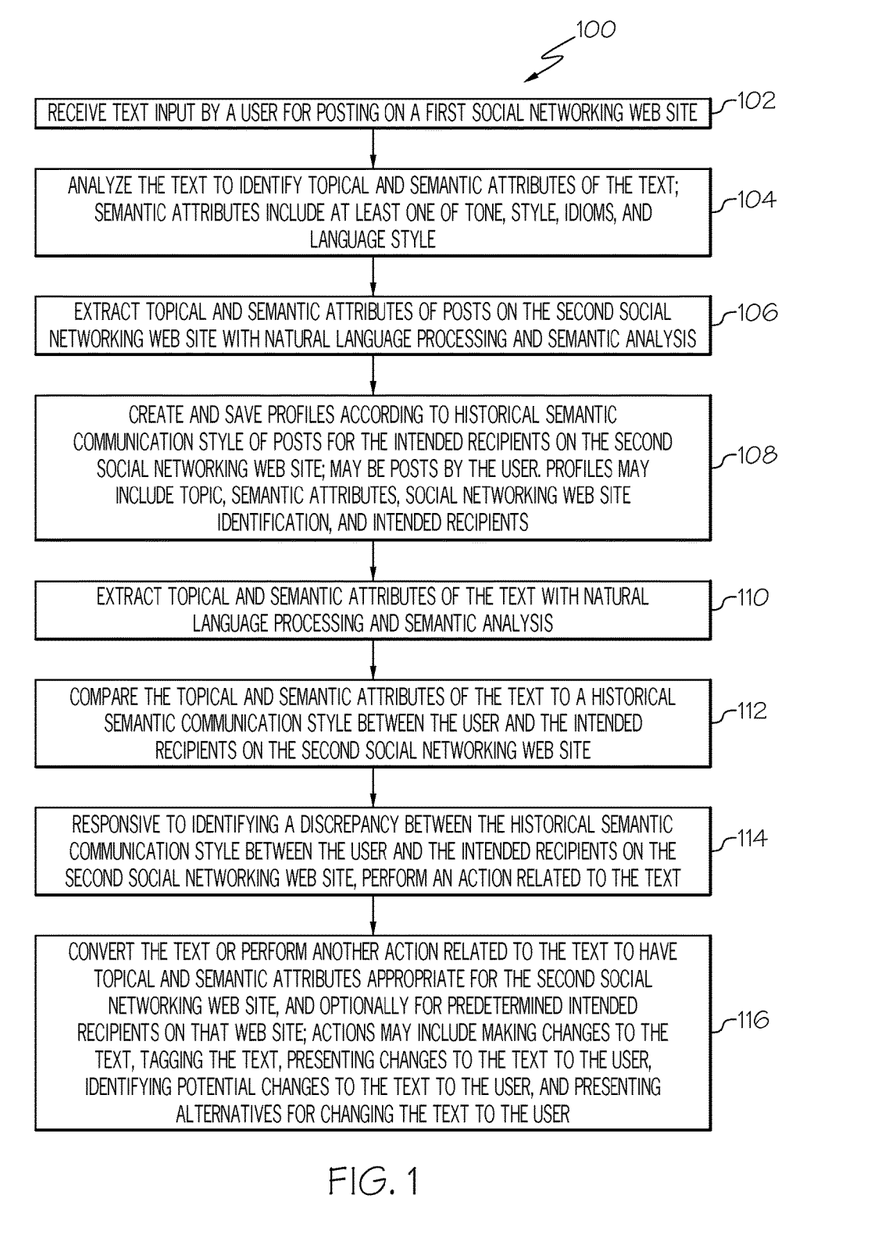
FIG. 1 is a flowchart of a method for conforming posts in social networking Web sites in accordance with an embodiment disclosed herein.

The method 100, 200 or system implementing the method 100, 200 disclosed herein, and as shown in one embodiment in FIGS. 1, 2A, and 2B, may be applicable to any online social network including asymmetric or I follow social networks or media such as Twitter® and symmetric social networks or I connect social networks such a Facebook®, LinkedIn®, Connections or other social networks where member may be connected for communications in both directions. Twitter® is a trademark of Twitter, Inc. in the United States, other countries or both. Facebook® is a trademark of Facebook, Inc. in the United States, other countries or both. LinkedIn® is a trademark of LinkedIn Corporation in the United States, other countries or both. Connections is a trademark of International Business Machines Corporation in the United States, other countries or both.

In some embodiments, the system analyzes interactions and social/collaborative content of the user and his or her social network. This content is analyzed using semantic analysis and natural language processing to identify tone, style, idioms, truncation, topics, and language. For simplicity these elements of tone, style, idioms, topics and language are referred to as "features" in the examples below.

Through methods known to one of ordinary skill in the art, analysis of features the system will keep track of the features seen in the posts from the user to certain other users within a social network site and certain groups within a certain network site. The communication features of the other users or groups may also be tracked within the social sites. Gathering this information, the features are tracked and recorded to help make sure the user's future posts are consistent with these features.

The system will modify, if needed, the wording of posts for a particular user, group, and/or social site. This allows the system to access a more granular level where even within a certain social network some users or groups will see the post with wording X, some users or groups will see the post with wording Y, or in a high level some users or groups of a social network site will see User's post X and some will see User's post Y. There can also be more levels of the post such as post X, Y, and Z, all with the same type of meaning but following the correct features for the target users or groups.

As an example, User A typically uses her Twitter account for business type of posts and is to hit stricter on her wording. User A typically uses her Facebook account for more friendly fun type of posts and is pretty free with her language and writing. The features of the posts for both systems are analyzed so that when User A posts to her Facebook account, which is federated with her Twitter account, her post to the Twitter account is converted to follow the results of the analysis of the existing posts and network. Natural Language Processing (NLP) may be used to analyze content of a message to determine a particular tone, style, idioms, topics and language or other characteristic.

While the Facebook post is deemed acceptable for the communication features based on the past analytics it lacks structure and includes relatively harsh words that are not appropriate for the communication features for User A's Twitter account. Specifically, a Facebook post might read: "Interesting post y'all—read. Some comments stupid. http://mylink." This post may then be reworded as an appropriate Twitter post: "Interesting post you should read. Some comments are irrelevant, http://mylink"

FIG. 1 shows an embodiment of a method 100 for converting text for application to one or more different Web sites, and starts at block 102 with receiving input by a user for posting on a first social networking Web site. The text is analyzed 104 to identify topical and semantic attributes of the text. Semantic attributes include at least one of tone, style, idioms, and language style. Topical and semantic attributes of posts on the second social networking Web site are extracted 106 with natural language processing and semantic analysis. Profiles are created and saved 108 according to historical semantic communication style of posts for the intended recipients on the second social networking Web site. Such posts may have originated by the user in one embodiment. Profiles may include topic, semantic attributes, social networking Web site identification, and intended recipients.

Topical and semantic attributes of the text are extracted 110 with natural language processing and semantic analysis. The topical and semantic attributes of the text are compared 112 to a historical semantic communication style between the user and the intended recipients on the second social networking Web site. Responsive to identifying a discrepancy between the historical semantic communication style between the user and the intended recipients on the second social networking Web site, an action may be performed 114 related to the text. The text may be converted or another action may be performed 116 related to the text to have topical and semantic attributes appropriate for the second social networking Web site, and optionally for predetermined intended recipients on that Web site. Actions may include making changes to the text, tagging the text, presenting changes to the text to the user, identifying potential changes to the text to the user, and presenting alternatives for changing the text to the user.

There are multiple embodiments for implementing the system and methods disclosed herein. In one embodiment described below and shown in FIGS. 2, 3A, and 3B, there are two sub-methods that combine to make up the overall system and method 100 embodiment of FIG. 1, the first being based on analysis of a user's past behavior, and optionally the user's close network, to gather data for each different user, recipient user group, and recipient social networking Web site, and second, analysis of a new message to be posted on a social networking Web site. In some instances additional actions, decisions, and detail are provided in FIGS. 2, 3A, and 3B beyond that provided in method 100 of FIG. 1.

Figure 2:
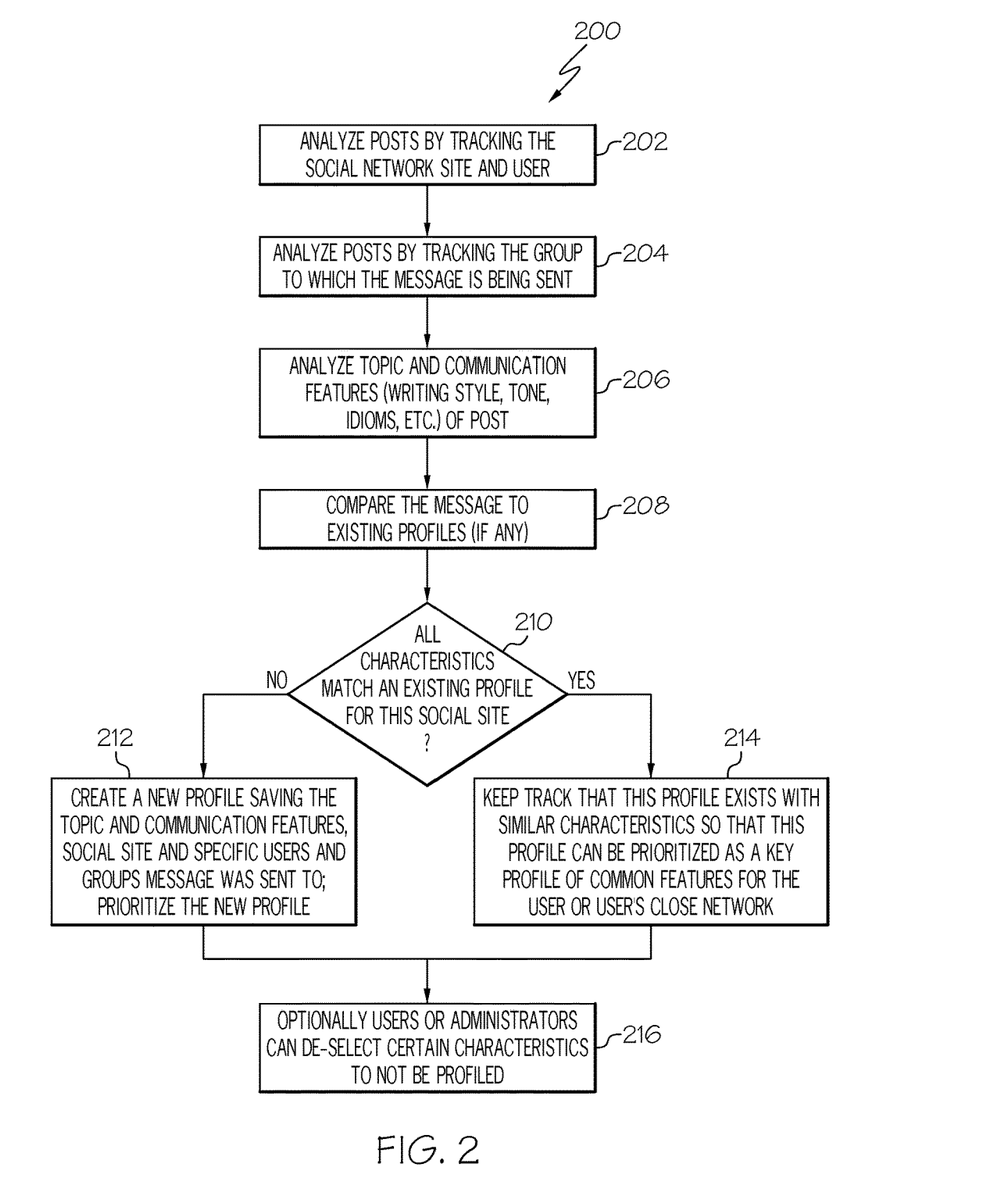
FIG. 2 is of part of a method for conforming posts in social networking Web sites in accordance with an embodiment disclosed herein.

As shown in FIG. 2, the data gathering sub-method 200 may begin with analyzing posts by tracking first the social network site and user at block 202 and also the group to which the message is being sent at block 204. The topic and semantic attributes, also referred to as communication features (writing style, tone, idioms, etc.), of the existing posts may be analyzed 206 with Natural Language Processing. The exiting posts may be compared to any existing profiles of posts and sites that have already been established and stored in a database by the system 208, and it is determined whether all characteristics of the message match an existing profile for the site 210. If there are no matches with existing profiles, a new profile is created, saving the topic and communication features, social site and specific users and groups to which the message was sent, with the new profile being prioritized 212. If all characteristics match an existing profile for this social site, this profile is kept track of as existing with similar characteristics so that this profile can be prioritized as a key profile of common features for the user or the user's close network 214. Optionally users or administrators can de-select certain characteristics to not be profiled 216.

Figure 3A:
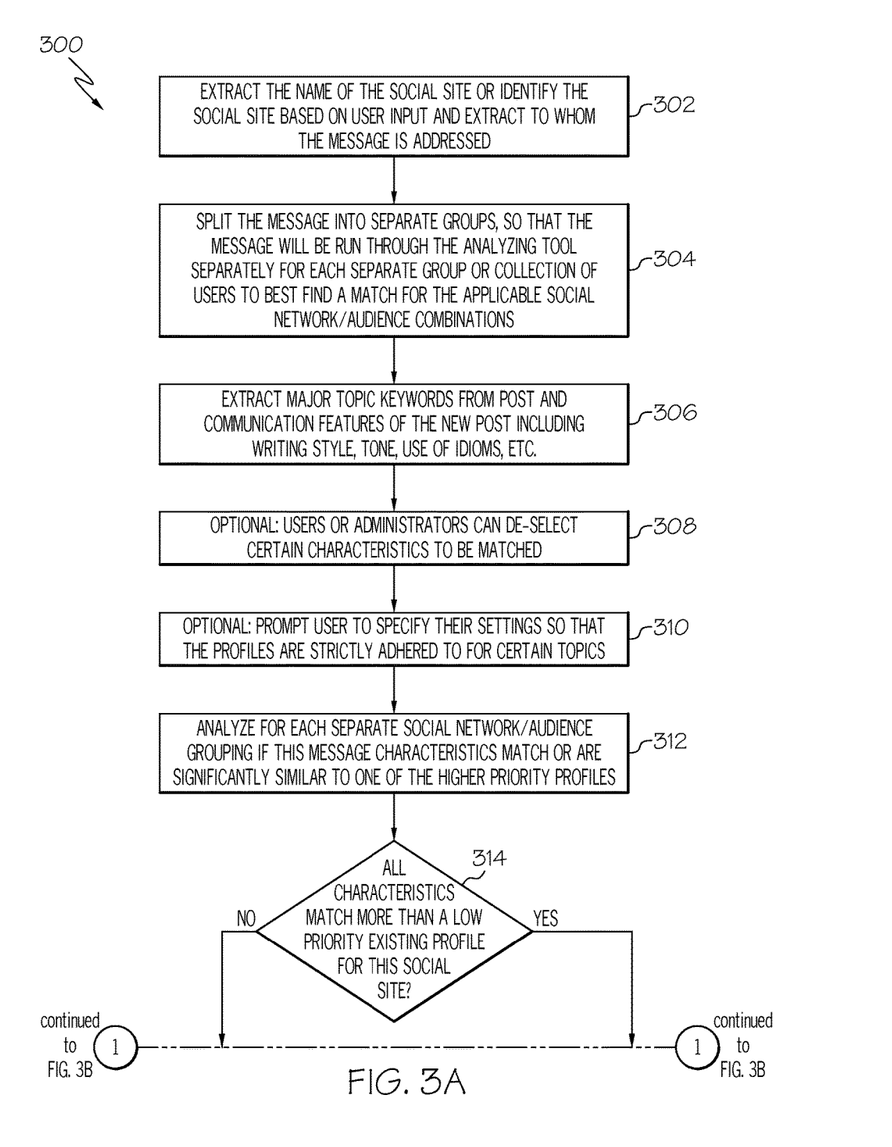
FIGS. 3A and 3B is a flowchart of the remainder of the method for conforming posts in social networking web sites in accordance with an embodiment.
Figure 3B:
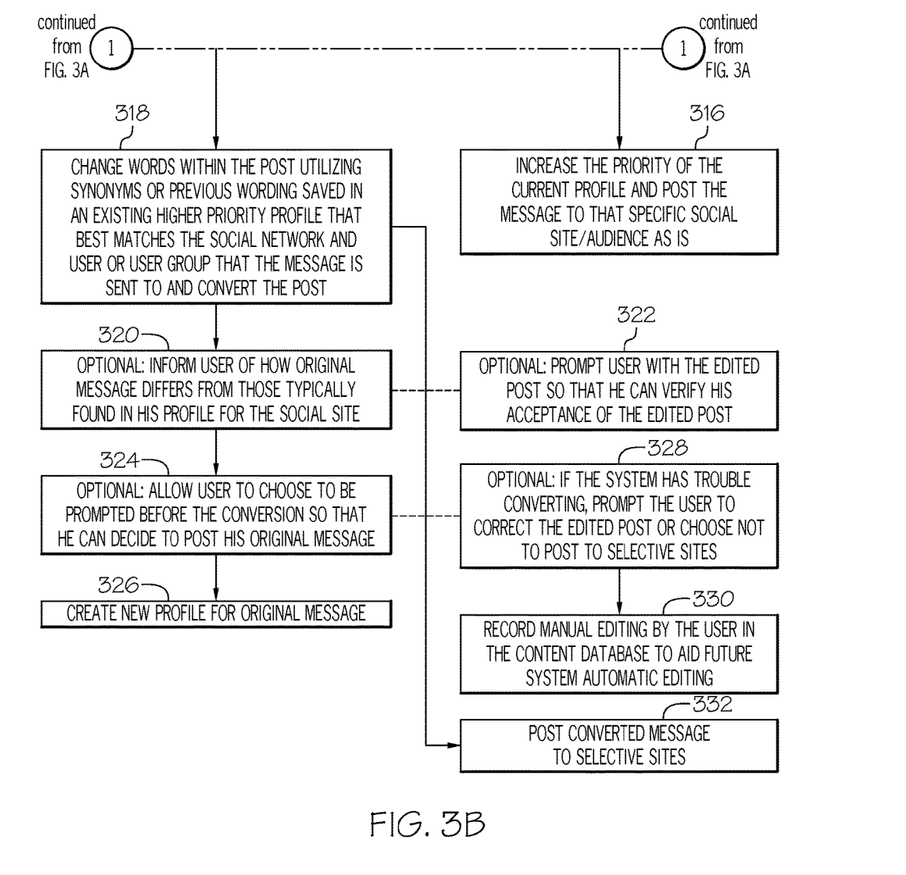

As shown in FIGS. 3A and 3B, the text sub-method is to analyze the new message 300. The name of the social site may be extracted from the message or identified based on other input from the user as may to whom the message is addressed 302. The message may be split into separate groups 304 so that the message will be run through the analyzing tool separately for each separate group or collection of users to find as best match for the applicable social network and audience combinations. Major topic keywords may be extracted from the new post 306 with communication features of the new post including writing style, the tone, use of idioms, etc.

Optionally users or administrators can de-select certain characteristics to be matched 308. Another option that the user may specify is customizing the settings so that the profiles are strictly adhered to for certain topics 310. If a post has the same or related topic, it would then need to follow an existing profile. In general the user does not have to have a profile for each topic or related topics unless she specifically wants to.

For each separate social network/audience grouping the post may be analyzed to determine if the message characteristics match or are significantly similar to one of the higher priority profiles 312. A "higher priority" may be based on, for example, a more frequently applied profile, and may be as numerical, value. Next, it is determined whether all characteristics match more than a low priority existing profile for the social site 314, i.e., whether the characteristics do not match any of the profiles in the database or they match only as profile with a low priority. If all characteristics do match more than a low priority existing profile, the priority of the current profile may be increased and the message may be posted to that specific social site/audience as is 316. If not, the system will change words within the post utilizing synonyms or previous wording saved in the existing higher priority profile that best matches the social network and user or user group that the message is sent to, and convert the post 318.

Optionally the user can be informed how his message differs from those found typically in their profile for the social site 320. Optionally the user can be prompted with the edited post so that he can verify his acceptance of the edited post 322. Also optionally, the user can also choose to be prompted before the conversion so that he can optionally decide to post his original message 324. If user decides affirmatively on this a new profile will be created for this message 326. Also optionally, if the system has trouble converting, it can prompt the user to correct the edited post or choose not to post to selective sites 328. Manual editing by the user may be recorded in the content database to aid future system automatic editing 330. The converted message may be posted to selective sites at block 332.

Figure 4:
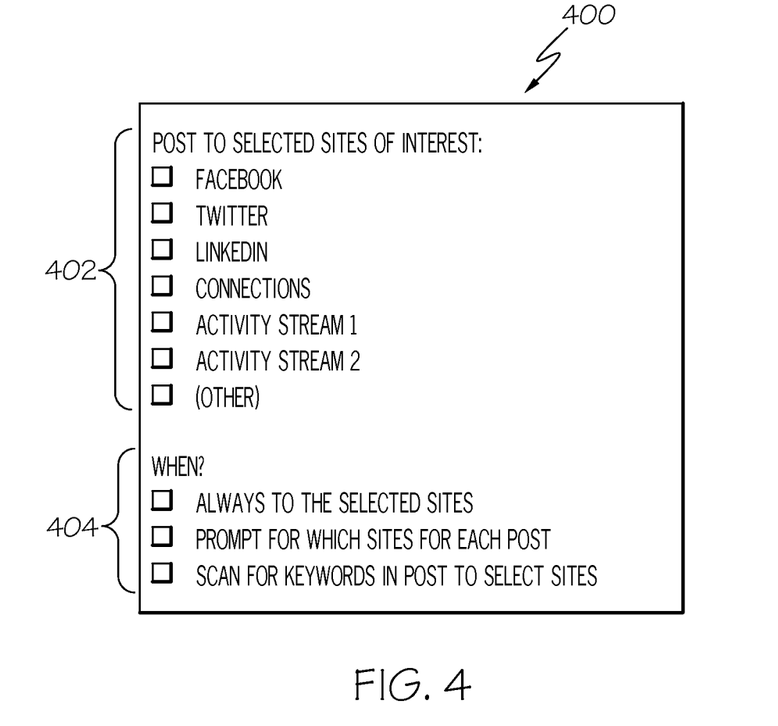
FIG. 4 is an embodiment of a graphical user interface for use in the method shown in FIGS. 1, 2, 3A, and 3B.

FIG. 4 represents an example of a graphical user interface 400 in which the user may identify where to post her message 402, for example, social networking Web sites Facebook, Twitter, LinkedIn, or Connections, or Activity Streams. The user may also identify when to post to the selected sites 404, such as always, in response to a prompt for each post, or based on a scan for keywords in the post to identify the sites. Other methods, such as by extracting the desired site from the message itself, may be the approach used, as discussed above.

Figure 5:
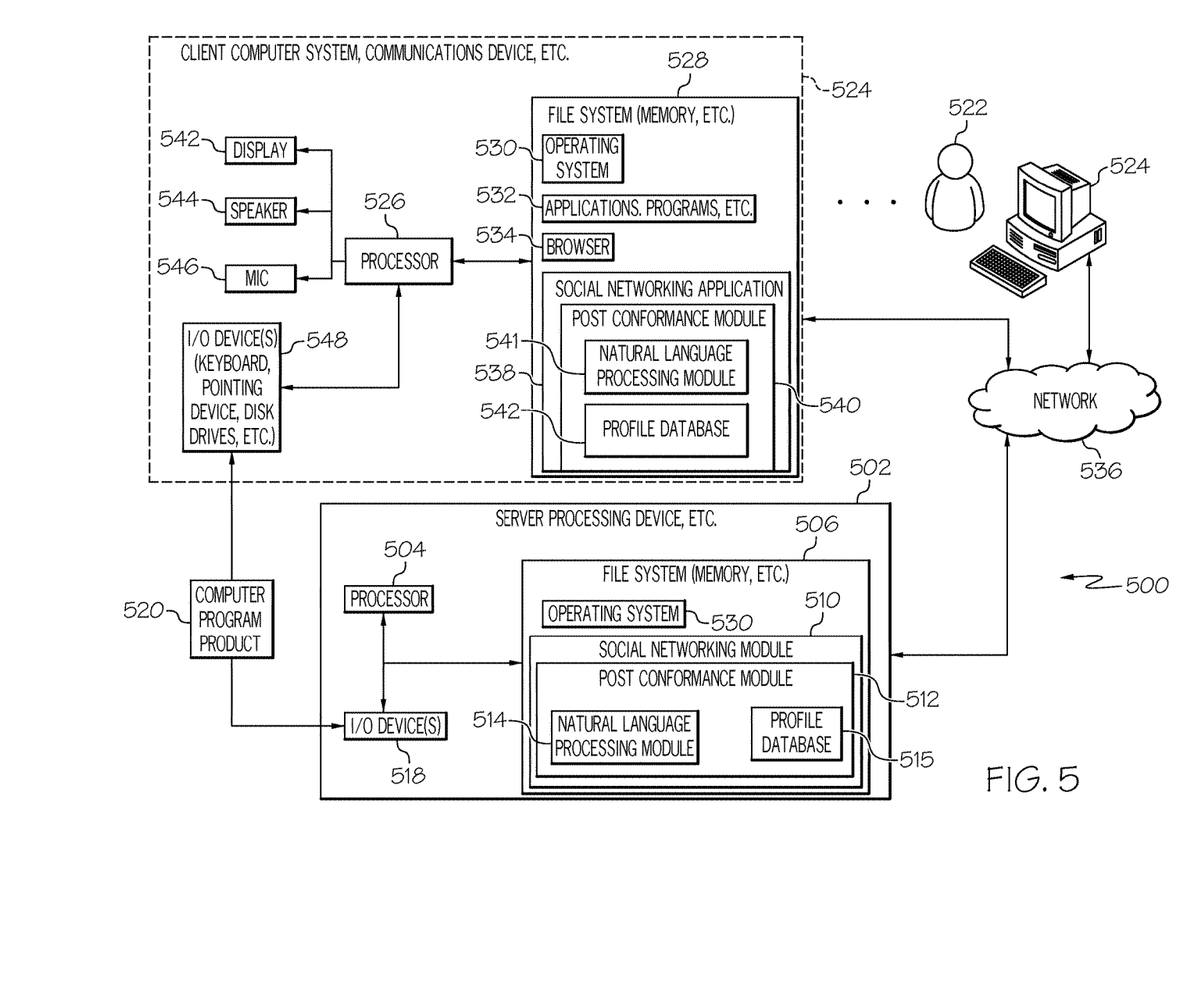
FIG. 5 is a block schematic diagram of a system for conforming posts in social networking Web sites in accordance with an embodiment disclosed herein.

FIG. 5 is a block, schematic diagram of an example of a system 500 for conforming posts in social media and networks in accordance with an embodiment of the present invention. The methods 100, 200, 300 of FIGS. 1, 2, 3A, and 3B may be embodied in and performed by the system 500. The system 500 may include a processing device 502. The processing device 502 may be a server or similar processing device. The processing device 502 may include a processor 504 for controlling operation of the processing device 502 and for performing functions, such as those described herein with respect to post conformance. The processing device 502 may also include a file system 506 or memory. An operating system 508, applications and other programs may be stored on the file system 506 for running or operating on the processor 504. A social networking module 510 or system may also be stored on the file system 506 and may be compiled and run on the processor 504 to perform the functions for conducting online communications or activity streams between users similar to that described herein. The social networking module 510 may be any type of online communications mechanism for online communications or conversations. The methods 100, 200, 300 may be embodied in the social networking module 510 and performed by the processor 504 when the social networking module 510 is compiled and run on the processor 504.

The social networking module 510 may include a post conformance module 512, which may include a Natural Language Processing module 514 or system. The social networking module 510 may be configured to perform functions similar to those described with reference to the method 100, 200, 300 in FIGS. 1, 2, 3A, and 3B.

The post conformance module 512 may also include a profile database 515. The profile database 515 may be similar to the profile database described above. The profile database 515 may either be part of or a separate component from the social networking module 410 and the post conformance module 512.

The processing device 502 may also include one or more input devices, output devices or combination input/output devices, collectively I/O devices 520. The I/O devices 518 may include, but are not necessarily limited to, a keyboard or keypad, pointing device, such as a mouse, disk drive and any other devices to permit a user to interface with and control operation of the processing device 502 and to access the social networking module 510 or system. At least one of the 170 devices 518 may be a device to read a computer program product, such as computer program product 520. The computer program product 520 may be similar to that described in more detail herein. The social networking module 510 may be loaded on the file system 406 from a computer program product, such as computer program product 520.

A member of a social network or user 522 of the system 500 for social networking may use a computer system 524 or communications device to access the processing device 502 or server and social networking module 510 or system. The computer system 524 or communications device may be any sort of communications device including a mobile or handheld computer or communications device. The computer system 524 may include a processor 526 to control operation of the computer system 524 and a file system 528, memory or similar data storage device. An operating system 530, applications 532 and other programs may be stored on the file system 528 for running or operating on the processor 526. A web or Internet browser 534 may also be stored on the file system 528 for accessing the processing device 502 or server via a network 536. The network 536 may be the Internet, an intranet or other private or proprietary network.

In accordance with an embodiment, a social networking application 538, feature or module may also be stored on the file system 528 and operate on the processor 526 of the user's computer system 524. The social networking application 538 may be any sort of online communications mechanism, such as a social networking or social media application, electronic mail client or email application, or other application for online communications or conversations capable of performing the functions and operations described herein. The social networking application 538 may include a post conformance module 540 similar to that described herein. In another embodiment, the post conformance module 540 may be a separate module from the social networking application 538 and operate in cooperation with the social networking application 538 to perform the functions described herein.

The post conformance module 540 may include a Natural Language Processing module 541 and may also include a profile database 542. In another embodiment, the profile database 542 may be part of or separate from the social networking application 538 and the post conformance module 540. The social networking application 538 operating on the computer system 524 may interface with or operate in conjunction with the social networking module 510 or system on the processing device 502 or server to perform the functions and operations described herein for post conformance in a social network. Accordingly, social networking application 538 operating, on the computer system 524 may perform some of the functions and operations of the methods 100, 200, 300 and social networking module 510 operating on the server 502 may perform other functions of the methods 100, 200, 300. Some embodiments of the present invention may include only the social networking module 510 and post conformance module 512 on the processing device 502 or server, and other embodiments may include only the social networking application 538 and post conformance module 540 on the client computer system 524 or communications device.

The computer system 524 may also include a display 542, a speaker system 544, and a microphone 546 for voice communications. One or more user interfaces may be presented on the display 542 for controlling operating the social networking module 510 and social networking application 538 and for performing the operations and functions described herein.

The computer system 524 may also include one or more input devices, output devices or combination input/output devices, collectively I/O devices 548. The I/O devices 548 may include a keyboard or keypad, pointing device, such as a mouse, disk drives and any other devices to permit a user, such as user 522, to interface with and control operation of the computer system 524 and to access the social networking application 538 and social networking module or system 510 on server 502. The I/O devices 548 may also include at least one device configured to read computer code from a computer program product, such as computer program product 522.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting, of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for conforming text posted on a social networking Web site for posting on another social networking Web site, the method comprising:

receiving, by a processing device, text input by a user for posting on a first social networking Web site;

analyzing the text, by the processing device, to identify topical and semantic attributes of the text, wherein the semantic attributes comprise writing style, tone and use of idioms;

extracting, by the processing device, topical and semantic attributes from exiting posts on a second social networking Web site with natural language processing and semantic analysis;

creating and saving a plurality of profiles, by the processing device, according to historical semantic communication style of the existing posts, wherein each profile comprises topic, semantic attributes, social networking Web site identification, and intended recipients;

comparing the text with the plurality of profiles;

creating a new profile and prioritizing the new profile in response to the topical and semantic attributes of the text not matching a saved profile of the plurality of profiles;

prioritizing an existing profile of the plurality of profiles as a key profile of common features for the user in response to the topical and semantic attributes of the text matching the existing profile; and converting the text, by the processing device, to have topical and semantic attributes appropriate for posting on the second social networking Web site, wherein converting the text comprises using a particular profile of the plurality of profiles that best matches the second social networking Web site and the intended recipient to which the text is sent.

2. The method of claim 1, wherein converting the text, by the processing device, comprises converting the text to have topical and semantic attributes appropriate for predetermined intended recipients on the second social networking Web site.

3. The method of claim 2, further comprising:
extracting topical and semantic attributes of the text with natural language processing and semantic analysis;
comparing the topical and semantic attributes of the text to a historical semantic communication style between the user and the intended recipients on the second social networking Web site; and
responsive to identifying a discrepancy between the historical semantic communication style between the user and the intended recipients on the second social networking Web site, performing an action related to the text.

4. The method of claim 3, wherein the action is selected from a group comprising making changes to the text, tagging the text, presenting changes to the text to the user, identifying potential changes to the text to the user, and presenting alternatives for changing the text to the user.

5. The method of claim 1, wherein a user or administrator may select certain topical and semantic attributes for omission from profiling.

6. The method of claim 1, further comprising including in the created and saved profiles historical semantic communication style of posts by the user for the intended recipients on the second social networking Web site.

7. The method of claim 1, wherein a user or administrator may select certain topical and semantic attributes for omission from matching.

8. The method of claim 1, wherein converting the text comprises changing words within the text utilizing synonyms or previous wording saved in an existing relatively high priority profile of the plurality of profiles that best matches the social networking Web site and the intended recipient to which the text is sent.

9. The method of claim 1, further comprising analyzing from a plurality of social networking Web site grouping whether the topic and semantic attributes match or are significantly similar to an existing relatively high priority profile.

10. The method of claim 9, further comprising for instances in which the topic and semantic attributes match or are significantly similar to the existing relatively high priority profile, increasing the priority of a current profile and posting the text to the second social networking Web site and intended recipients without action taking in converting the text.

11. A system for conforming text posted on a social networking Web site for posting on another social networking Web site, the system comprising:
a processor;
a module, operating on the processor, for conforming text posted on a social networking Web site for posting on another social networking Web site, the module comprising:
a module for receiving text input by a user for posting on a first social networking Web site;
a module for analyzing the text to identify topical and semantic attributes of the text, wherein the semantic attributes comprise writing style, tone and use of idioms;
a module for extracting topical and semantic attributes from exiting posts on a second social networking Web site with natural language processing and semantic analysis;
a module for creating and saving a plurality of profiles according to historical semantic communication style of the existing posts, wherein each profile comprises topic, semantic attributes, social networking Web site identification, and intended recipients;
a module for comparing the text with the plurality of profiles;
a module for creating a new profile and prioritizing the new profile in response to the topical and semantic attributes of the text not matching a saved profile of the plurality of profiles;
a module for prioritizing an existing profile of the plurality of profiles as a key profile of common features for the user in response to the topical and semantic attributes of the text matching the existing profile; and
a module for converting the text to have topical and semantic attributes appropriate for posting on the second social networking Web site, wherein converting the text comprises using a particular profile of the plurality of profiles that best matches the second social networking Web site and the intended recipient to which the text is sent.

12. The system of claim 11, wherein the module for converting the text comprises a module for converting the text to have topical and semantic attributes appropriate for predetermined intended recipients on the second social networking Web site.

13. The system of claim 12, further comprising:
a module for extracting topical and semantic attributes of the text with natural language processing and semantic analysis;
a module for comparing the topical and semantic attributes of the text to a historical semantic communication style between the user and the intended recipients on the second social networking Web site; and
a module for performing, responsive to identifying a discrepancy between the historical semantic communication style between the user and the intended recipients on the second social networking Web site, an action related to the text, wherein the action is selected from a group comprising making changes to the text, tagging the text, presenting changes to the text to the user, identifying potential changes to the text to the user, and presenting alternatives for changing the text to the user.

14. A computer program product for conforming text posted on a social networking Web site for posting on another social networking Web site, the computer program product comprising:
a computer readable storage medium having computer readable program code embodied therewith, the computer readable program code comprising:
computer readable program code configured to receive text input by a user for posting on a first social networking Web site;
computer readable program code configured to analyze the text to identify topical and semantic attributes of the text, wherein the semantic attributes comprise writing style, tone and use of idioms; and
computer readable program code configured to extract topical and semantic attributes from exiting posts on a second social networking Web site with natural language processing and semantic analysis;
computer readable program code configured to create and save a plurality of profiles according to historical semantic communication style of the existing posts, wherein each profile comprises topic, semantic attributes, social networking Web site identification, and intended recipients;
computer readable program code configured to compare the text with the plurality of profiles;

computer readable program code configured to create a new profile and prioritize the new profile in response to the topical and semantic attributes of the text not matching a saved profile of the plurality of profiles;

computer readable program code configured to prioritize an existing profile of the plurality of profiles as a key profile of common features for the user in response to the topical and semantic attributes of the text matching the existing profile; and computer readable program code configured to convert the text to have topical and semantic attributes appropriate for posting for predetermined recipients on the second social networking Web site, wherein converting the text comprises using a particular profile of the plurality of profiles that best matches the second social networking Web site and the intended recipient to which the text is sent.

15. The computer program product of claim 14, further comprising:

computer readable program code configured to extract topical and semantic attributes of the text with natural language processing and semantic analysis;

computer readable program code configured to compare the topical and semantic attributes of the text to a historical semantic communication style between the user and the intended recipients on the second social networking Web site; and computer readable program code configured to perform, responsive to identifying a discrepancy between the historical semantic communication style between the user and the intended recipients on the second social networking Web site, an action related to the text.

* * * * *